United States Patent [19]
Clark

[11] Patent Number: 5,892,902
[45] Date of Patent: Apr. 6, 1999

[54] INTELLIGENT TOKEN PROTECTED SYSTEM WITH NETWORK AUTHENTICATION

[76] Inventor: Paul C. Clark, 4705 Broadbrook Dr., Bethesda, Md. 20814

[21] Appl. No.: 708,412

[22] Filed: Sep. 5, 1996

[51] Int. Cl.[6] ........................................... G06F 11/00
[52] U.S. Cl. ............................................... 395/187.01
[58] Field of Search ...................... 395/187.01, 186, 395/188.01; 380/3, 4, 25; 364/286.5

[56] References Cited

U.S. PATENT DOCUMENTS

| | | | |
|---|---|---|---|
| 4,890,323 | 12/1989 | Beker et al. | 380/25 |
| 4,924,378 | 5/1990 | Hershey et al. | 364/200 |
| 5,327,497 | 7/1994 | Mooney et al. | 380/25 |
| 5,371,692 | 12/1994 | Draeger et al. | 364/580 |
| 5,416,842 | 5/1995 | Aziz | 380/30 |
| 5,432,851 | 7/1995 | Scheidt et al. | 380/25 |
| 5,448,045 | 9/1995 | Clark | 235/382 |
| 5,455,953 | 10/1995 | Russell | 395/739 |
| 5,491,752 | 2/1996 | Kaufman et al. | 380/30 |
| 5,506,961 | 4/1996 | Carlson et al. | 395/186 |
| 5,511,122 | 4/1996 | Atkinson | 380/25 |
| 5,623,637 | 4/1997 | Jones et al. | 395/188.01 |
| 5,636,280 | 6/1997 | Kelly | 380/21 |
| 5,657,388 | 8/1997 | Weiss | 380/23 |
| 5,675,800 | 10/1997 | Fisher, Jr. et al. | 395/700 |

OTHER PUBLICATIONS

Security Technology Group, and Trusted Information Systems, Inc. "System Architecture Overview for the Advanced Smartcard Access Control System (ASACS)", Nov. 13, 1992.

Primary Examiner—Robert W. Beausoliel, Jr.
Assistant Examiner—Scott T. Baderman
Attorney, Agent, or Firm—Cahn & Samuels, LLP

[57] ABSTRACT

An intelligent token protected system includes a local host computer, an intelligent token in communication with the local host computer and a remote host computer in communication with the local host computer. The intelligent token interacts with the local host computer to perform a secure boot on the local host computer with minimal user input. Without additional user input, the intelligent token also interacts with the remote host computer to authenticate the local host computer to the remote host computer.

21 Claims, 7 Drawing Sheets

INTELLIGENT TOKEN PROTECTED SYSTEM WITH NETWORK AUTHENTICATION

FIELD OF THE INVENTION

The present invention relates to the computer security field. More particularly, the present invention relates to a network authentication system and method using an intelligent token.

BACKGROUND OF THE INVENTION

Security is a particularly vexing problem in the computer industry. Users often perform sensitive applications and tasks on their computers and they are desirous of maintaining confidentiality with respect to their information and data. In computer systems, it is common to use a firewall to separate various segments of a network.

As defined herein, a firewall is a bastion host which separates administrative domains. An administrative domain may be a single computer or a network of computers. For example, in a conventional computer system, a firewall may be utilized to separate a local area network from a wide area public network, e.g., the Internet. Firewalls may also be used to secure an intranet domain against unauthorized access. For example, in a large corporate environment, the firewall may separate the local corporate net from a dedicated segment used by one of the corporate departments.

Firewalls physically separate administrative domains. All traffic from one domain (the local domain) that is directed to a second domain (the remote domain) must pass through the firewall. Thus, if a user operating from the local domain would like to communicate with the remote domain, the user must communicate through the firewall.

User authentication to the firewall is required in order to communicate with the remote domain. Authentication is a check to ensure that the user is authorized to have access to a given device, e.g., an intelligent token, a computer, etc. Existing systems authenticate users through the use of reusable passwords or challenge-response techniques. In a password based system, after the user has "booted" a local host computer, the user requests a connection to a remote host computer, provides a user identifier and, when prompted, provides a password. Successive authentications use the same user identification and password. Hence, an attacker who misappropriates a user password is able to easily and continuously gain access to the remote host, and, thus, the remote domain.

In a challenge-response system, the remote host requests a user identifier and issues a challenge to the user. The user calculates a response which, if deemed valid by the remote host, grants access to the remote host. Because the challenge changes for successive authentications, the challenge-response method is not vulnerable to password misappropriation as described above. However, responses to the challenges must be computed. They may be computed 1) manually, 2) by the local host using software methods or 3) by a portable hardware device. In each of the three cases, the user is required to manually enter the calculated response. In many systems, the user must also enter the challenge.

It is readily apparent from the above described procedures that in order to communicate with the remote domain, the user is required to remember extensive information regarding the system and provide substantial input to the system. The user must know and input the required information to boot the local host computer. Further, the user must input additional information to access the remote host. Hence, there is need for a system that allows the user secure access to remote domains with minimal information input.

SUMMARY OF THE INVENTION

In accordance with an aspect of the invention, an intelligent token is provided which stores critical information including authentication information. A local host computer is coupled with the intelligent token such that the local host computer communicates authentication information with the intelligent token. After the local host computer has been authenticated, the local host computer communicates authentication information to a remote host computer without input from the user. The remote host computer is then authenticated.

In a preferred embodiment of the invention, the intelligent token sends a request for access to the remote host computer and the remote host computer sends a challenge to the intelligent token in response. The challenge is stored in the memory of the remote host computer. The intelligent token generates a response to the challenge and the response is verified by the remote host computer using the stored challenge thus allowing free communication between the intelligent token and the remote host computer.

In accordance with another aspect of the invention, the intelligent token includes a CPU and first and second memory units. The first memory unit stores an operating system. The second memory unit stores critical information including host and remote authentication information such as cryptographic keys and file signature information. The authentication information may include host and remote access codes.

A particularly advantageous feature of the invention is that the local host computer and the remote host computer are authenticated with no more user input than is necessary to authenticate the intelligent token. Thus, the system is securely insulated from attack because the authentication information is stored in the intelligent token.

Yet another advantageous feature of the invention is that it facilitates a secure boot for the local host computer and automatically authenticates the remote host computer to the intelligent token without further input from the user.

Still another advantageous feature of the invention is that it provides a virus check for files stored on both the remote and host computers.

An additional advantageous feature of the invention is that it facilitates encrypted communication between the local host computer and the remote host computer.

DETAILED DESCRIPTION OF THE EMBODIMENTS

Figure 1:
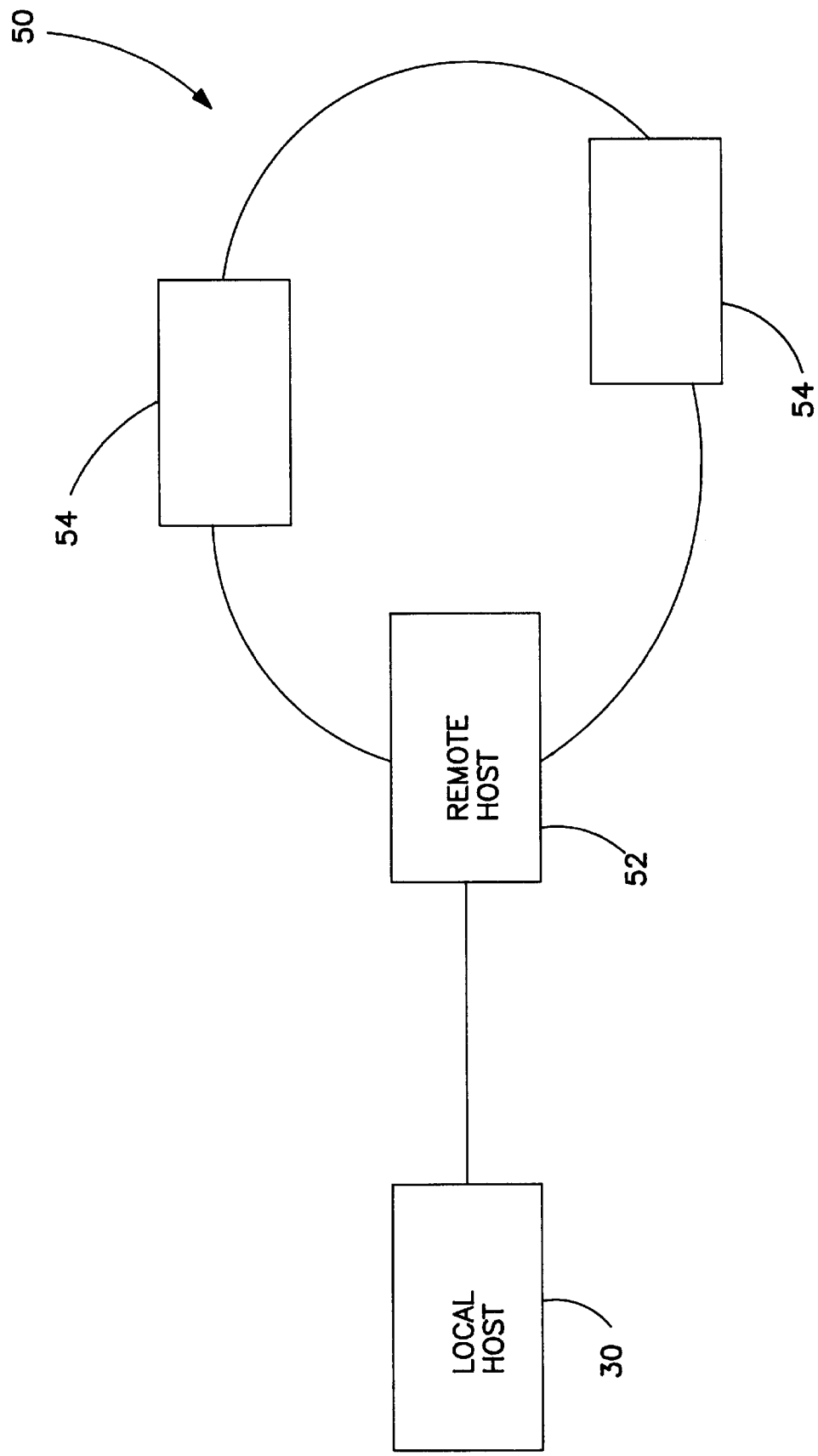
FIG. 1 is a block diagram illustrating the local host computer coupled to the remote domain.

The present invention is an improvement to the invention described in U.S. Pat. No. 5,448,045 which is incorporated by reference. Generally, the present invention relates to a system and method for securely linking computers using an intelligent token. In U.S. Pat. No. 5,448,045, a computer is securely booted directly from an intelligent token and the computer is authenticated to the intelligent token. The present invention, in addition to the secure boot, provides the user with access to a remote domain including a remote host computer using the intelligent token. That is, the present invention authenticates the user and the intelligent token to the remote host computer without the necessity of the user inputting additional authentication information. Referring to FIG. 1, for example, the intelligent token (not shown) may be coupled with a local host computer 30 and the local host computer 30 may be coupled to the remote domain 50. The present invention allows the user to 1) securely boot the local host computer 30 and 2) authenticate the intelligent token 10 to the remote host computer 52 and, thus, to the remote domain 50 to allow free communication back and forth between the local host computer 30 and the remote domain 50.

Figure 2:
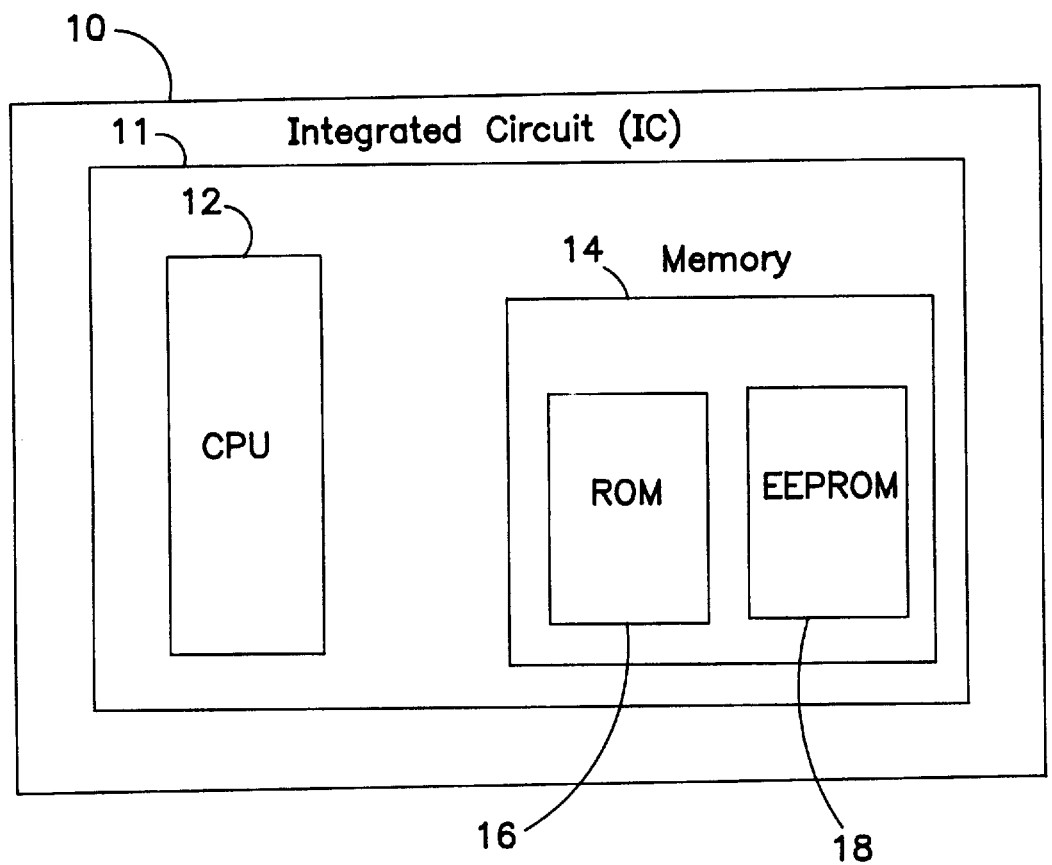
FIG. 2 depicts the intelligent token.
Figure 3:
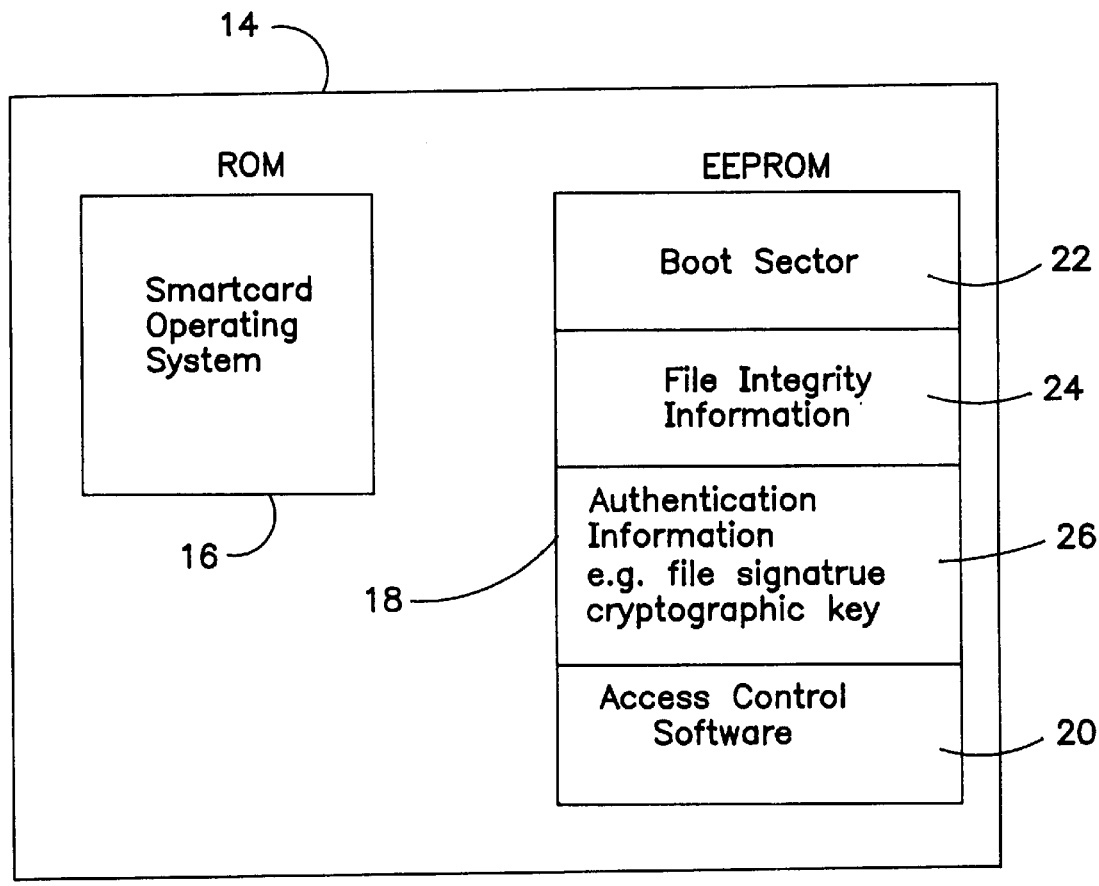
FIG. 3 shows is an enlarged view of the memory of the intelligent token.

In accordance with the invention, as shown in FIG. 2, the intelligent token 10 includes an IC (integrated circuit) 11 having a CPU 12 and a memory 14. The memory 14 includes a ROM 16 and an EEPROM 18. As depicted in FIG. 3, the intelligent token 10 stores a protected copy of the file that is usually stored in a disk boot sector of a computer along with other file integrity data. The ROM 16 preferably stores the operating system of the intelligent token 10. The EEPROM 18 preferably stores software programs to enforce access control to the host computer and access control to the remote domain 50 (access control software 20). For example, the EEPROM 18 may include software that generates a request for access to the remote host computer 52 as well as software that generates responses to challenges sent by the remote host computer 52. In addition, critical information such as boot sector information 22, file integrity information 24 and authentication information 26 may be stored in the EEPROM 18. The authentication information may include, e.g., file signature information and cryptographic keys for both the host and remote computers. Also, other sensitive or private information may be stored to ensure its integrity such as a remote access code for the remote host computer.

Traditionally, the above described critical information has been stored in the host computer's boot-sector memory. However, it is desirable to store as much information as possible on the intelligent token 10. Of course, the amount of memory available in the intelligent token 10 will dictate the amount of data which may be stored there.

In a preferred embodiment, the intelligent token 10 may be a smart card marketed under the trade designation MCOS32k by Gemplus International. The International Standards Organization (ISO) defines a smart card as a credit card sized piece of plastic having an embedded IC. While the MCOS32k is particularly preferred, several chip vendors including SGS Thompson, Datakey and Toshiba provide IC's for use with intelligent tokens in the form of smart cards, keys and PCMCIA cards that may be used with the instant invention. In general, these vendors have employed micro-controllers in their IC's with clock rates much lower than typical desktop computers. These IC's are used in smart cards and other intelligent tokens. However, higher performance chips are under development.

Figure 4:
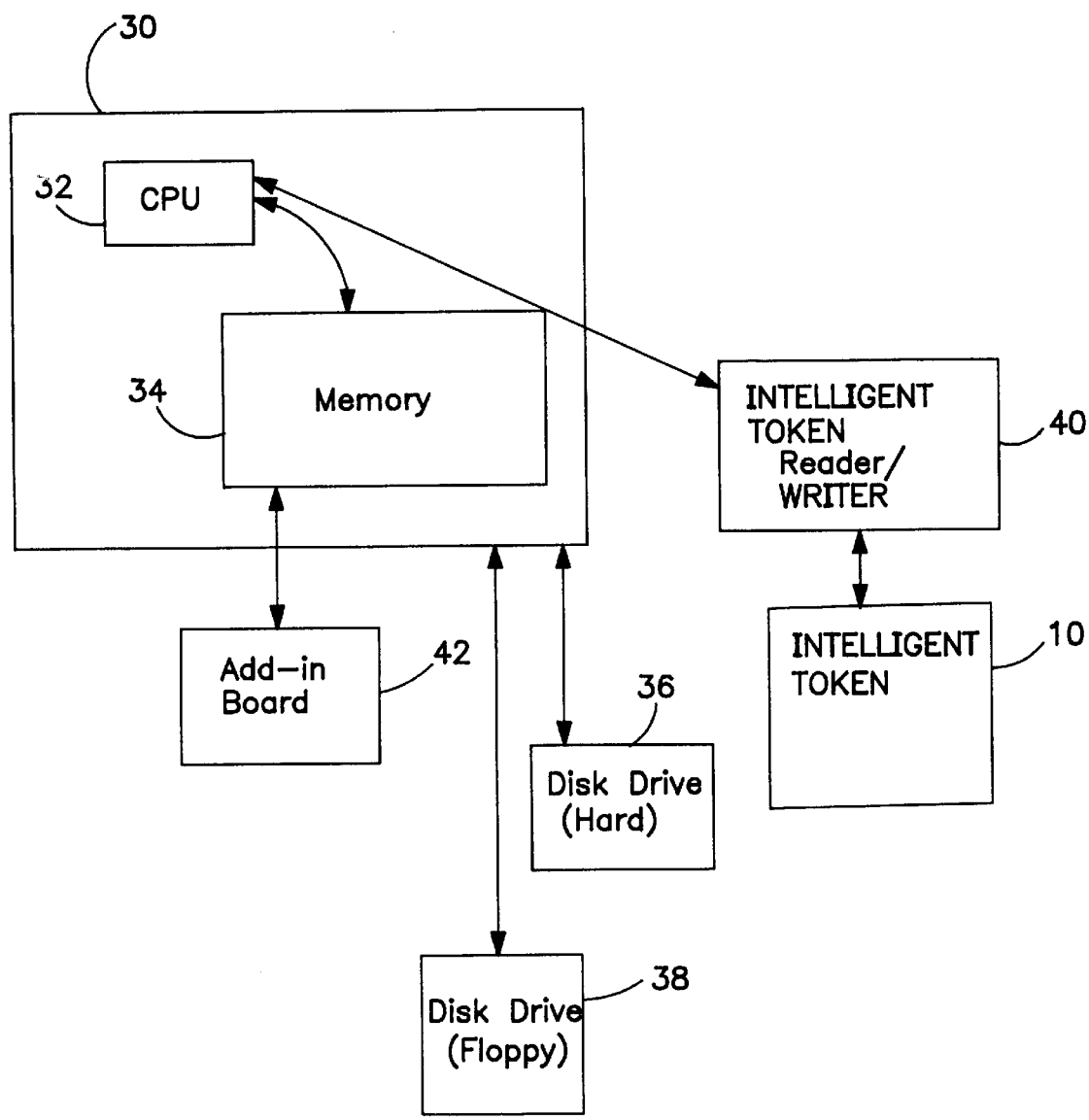
FIG. 4 is a block diagram of the local host computer.

The host computer is preferably an IBM or IBM compatible PC. Accordingly, as illustrated in FIG. 4, the host computer 30 preferably includes a central processing unit (CPU) 32 connected to a memory 34. The host computer may also include a hard disk drive 36 and a floppy disk drive 38. Preferably, the host computer has a modified boot program. On a PC, for example, this may be realized by a modification of the BIOS or by addition of an add-in board 42 with a BIOS extension. Configuration software and file signature software are provided with the host computer. A reader/writer 40 for the intelligent token 10 is preferably coupled to the host computer. The reader/writer is preferably a smart card drive. The add-in board 42 (or modified BIOS) contains additional memory in the form of a special boot PROM which is loaded with a modified boot program which interfaces to the reader/writer. Further, the add-in board is configurable to set an identifier for the host.

The remote domain 50 may consist of a remote host computer 52. The remote host computer 52 preferably has a basic construction similar to the local host computer 30. However, the remote host computer 52 may also include a challenge generator that generates challenge signals responsive to a request for access to the remote computer 52. The challenge generator may be implemented in hardware or software. An exemplary challenge generator is a random number generator. The remote host computer 52 may store validation information in its memory to validate responses emanating from the intelligent token 10.

The remote domain 50 is not limited to a single remote host computer. The remote domain 50 may consist of a network including the remote host computer 52 and other computers 54. For example, the remote domain 50 may include a network such as the Internet, and the remote host computer 52 may be a firewall.

As explained in U.S. Pat. No. 5,448,045, during system start up, two authentications must be successfully performed to complete the boot sequence. First, the user must be authenticated to the intelligent token 10 (user authentication) and, second, the intelligent token 10 must be authenticated to the host (host authentication). To authenticate the user to the intelligent token 10, the user enters a password to the reader/writer. The intelligent token 10 checks the password to confirm that the user is authorized to use the intelligent token 10. If successful, the intelligent token 10 allows the host computer to read the boot sector and other information from the intelligent token memory. To authenticate the intelligent token 10 to the host, the intelligent token 10 must also make available a secret shared with the local host 30 (a local secret) such as a configurable host identifier. If both the user and card authentication are successful, the boot sequence completes, and control is given to the host computer operating system—some or all of which has been retrieved from the intelligent token 10. The user may then proceed to utilize the host computer in the usual fashion, uploading additional information, i.e., applications or application integrity information from the intelligent token 10 as needed.

Figure 5:
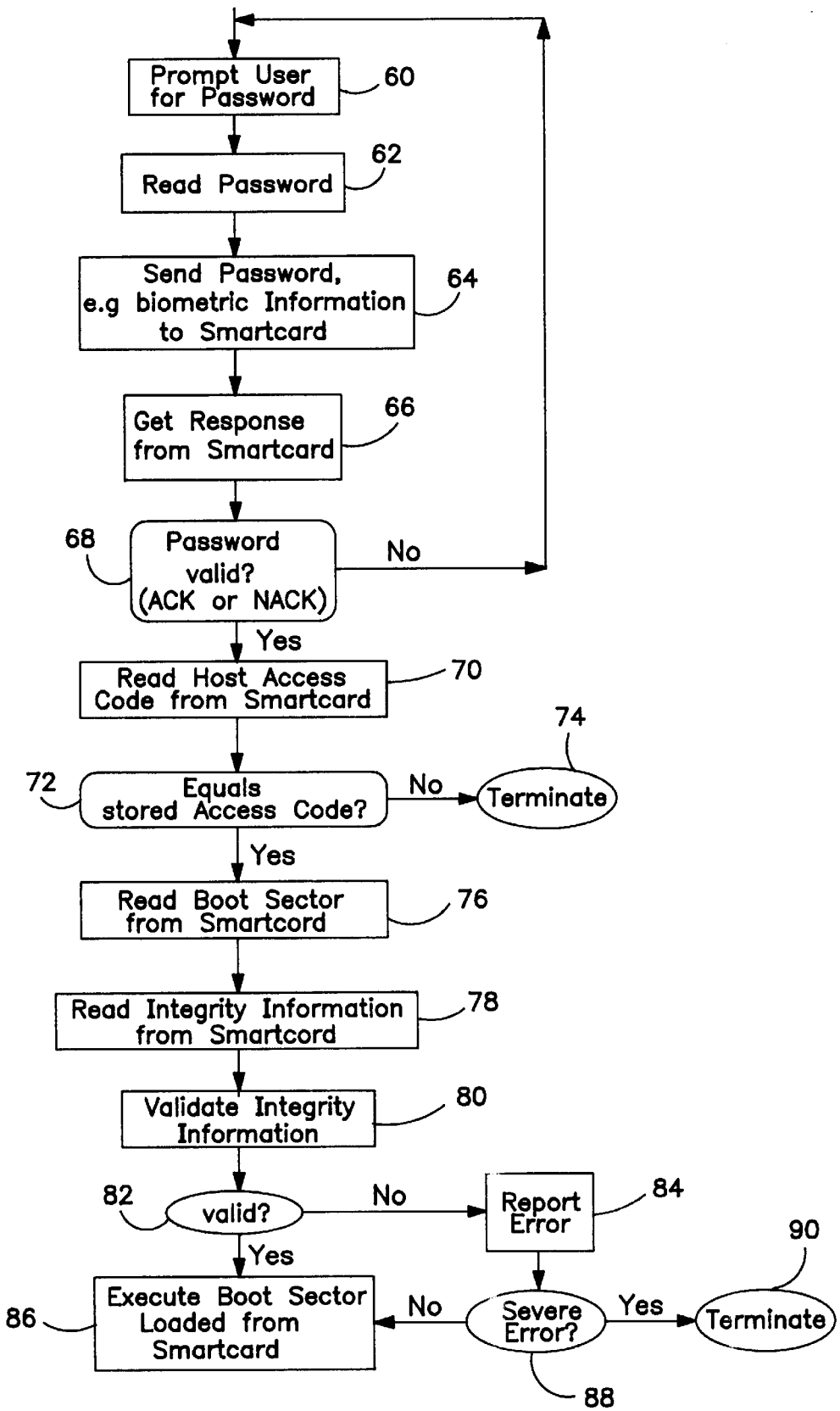
FIG. 5 is a flowchart describing the boot and authentication processes from the perspective of the local host computer.
Figure 6:
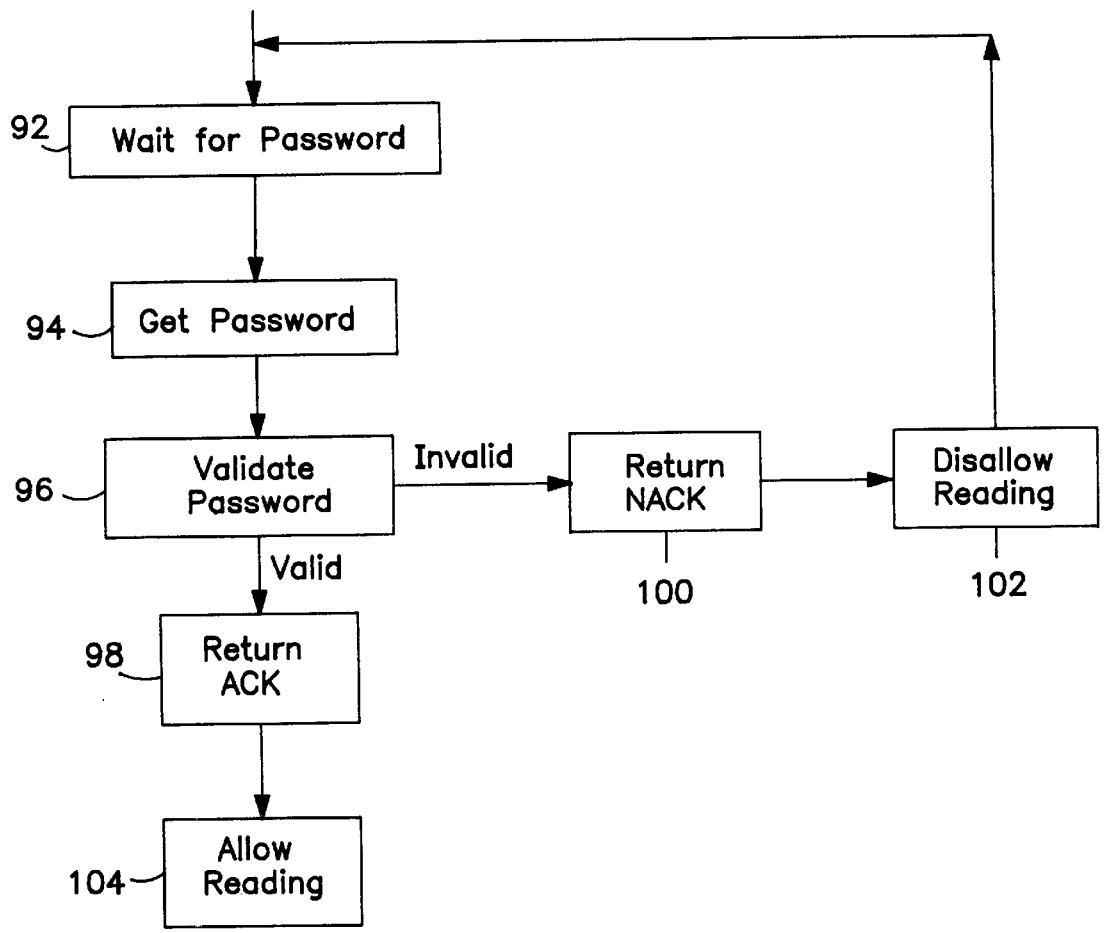
FIG. 6 is a flowchart describing the boot and authentication process from the perspective of the intelligent token.

Refer now to FIGS. 5 and 6, which show the control flow of the of the modified boot sequence from the point of view of the local host computer 30 and the intelligent token 10, respectively. The flow diagram in FIG. 5 shows the control flow of the modified boot program loaded from the BIOS extension add-in card in the original boot sequence. FIG. 6 shows the processing that occurs during the boot sequence on the CPU 12 of the intelligent token 10 while it is in the intelligent token reader/writer 40.

Turning to FIG. 5, the modified boot program (BIOS extension) prompts the user for a password at step 60. The user inputs a password and the password is read in step 62. In step the password is sent to the intelligent token 10. At the same time, as illustrated in FIG. 6, the intelligent token 10 waits for a password at step 92. When the intelligent token 10 receives a password in step 94 it validates the password using whatever built-in validation scheme is present on the intelligent token 10 (step 96). If the password is invalid then the intelligent token 10 returns a "NACK" signal to the local host computer 30 in step 100, disallows reading of its data in step 102 and continues to wait for another password. In some systems a count is kept of the number of times an invalid password is entered, with only a limited number of failed attempts allowed before the system shuts down and requires operator or administrator intervention. If the password is valid then intelligent token 10 returns an "ACK" signal to the local host computer 30 in step 98 and allows reading of the data and its memory and files in step 104.

From the perspective of the local host computer 30, it waits for the response from the intelligent token 10 in step 66 of FIG. 5 and then bases its processing on the return result from the intelligent token 10 (step 68). If the password is invalid, i.e., the intelligent token 10 returns a "NACK" signal, then the user is once again prompted for a password and the procedure returns to step 60. If the password is valid, the user is authenticated to the intelligent token 10 and now the local host computer 30 attempts to authenticate the card to the system. It does this by reading a host access code 46 from EEPROM 18 of the intelligent token 10 (step 70). The host access code is one of the items of data stored on the intelligent token 10 by the system administrator during system configuration. In step 72, the host access code from the intelligent token 10 is compared to the one that is stored in the local host computer 30. If they are unequal then the intelligent token 10 is not allowed for this local host computer 30 and the boot process is terminated in step 74. Preferably, this termination ends the entire boot process—the boot program does not then try to boot from a disk. If the check at step 72 finds the codes to be equal then the card is authenticated to the host and the boot sector information 22 from the EEPROM 18 of the intelligent token 10 is read into memory 34 of the local host computer 30.

Because of the limited size of the memory on smart cards today, it is not yet possible to store all the information in files for an OS the size of e.g., MS/DOS on a smart card. Therefore, the other files will have to be read from a disk or other storage device. It is, however, still possible to ensure their integrity by use of integrity information, e.g., checksums for the files, stored on the intelligent token 10 (by a system administrator).

In step 78 the BIOS extension program reads the file integrity information 44 from the EEPROM 18 of the smart card 22. Then, for each file whose integrity is required, e.g., IO.SYS., etc., the integrity information for that file is validated in step 80. In step 82, the validity of the integrity information is determined. If the OS files are found to be invalid then an error is reported to the user in step 84. If the error is considered to be severe then the boot process terminates (in step 90).

The determination of what constitutes "severe" is made in advance by the system administrator based on the security requirements of the system. The system may be arranged such that no file changes are allowed. Alternatively, the system may be arranged such that specific files may be modified, but not others.

If the file integrity information is valid or the error is not considered severe then the boot sector that was loaded from the intelligent token 10 in step 76 is executed in step 86. At this point, the boot process will continue as if the boot sector had been loaded from a disk, as is traditionally the case.

Figure 7:
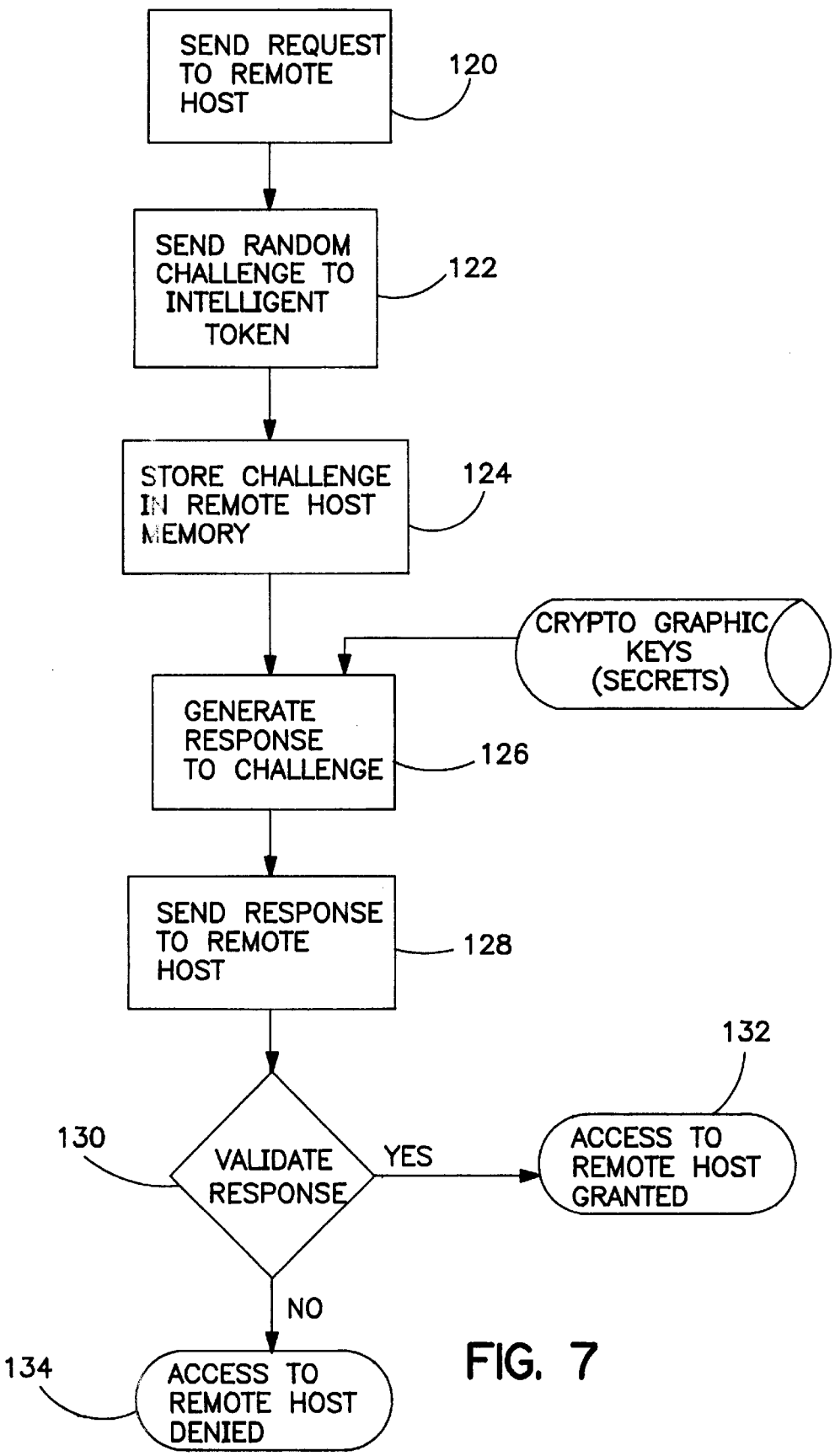
FIG. 7 is a flowchart illustrating the remote domain authentication process.

Turning to FIG. 7, in accordance with a preferred aspect of the invention, the intelligent token 10 also authenticates the user to the remote host computer 52. After the user has been authenticated and the host has been authenticaticated and securely booted, without further input from the user, the intelligent token 10 automatically sends a request for access to the remote host computer 52 (step 120). The remote host computer 52 responds to the request by sending a randomly generated challenge to the intelligent token 10 (step 122). The challenge is stored in the remote host memory for purpose of verifying the response (step 124). The intelligent token 10 generates a response to the challenge. Perferably, the response is based on a secret stored in the intelligent token 10 which may be known to the user, i.e., a remote secret (step 126). The remote host computer 52 may or may not know the remote secret and the remote secret may or may not be the same as the local secret. The response is then sent to the remote host computer 52 (step 128) for validation (step 130). If the remote host computer finds the response to be valid, access to the remote host is granted to the user (step 132). If the remote host computer 52 finds the response to be invalid, access to the remote host computer 52 may be denied (step 134).

As discussed above, the intelligent token 10 stores critical information such as digital file signatures for system executables and the user's cryptographic keys. Comparing executable computer file signatures of the remote and local hosts with those stored on the intelligent token 10 provides a virus detection mechanism which is difficult to defeat. This approach is consistent with recent trend to validate the file integrity rather than solely scan for known virus signatures. In addition, by authenticating both the local host computer 30 and the remote host computer 52, the intelligent token 10 may be employed to facilitate "encrypted communication" between the local host computer 30 and the remote host computer 52.

In keeping with the present invention, the intelligent tokens may be configured and issued by a security officer. The configuration entails loading critical information onto the intelligent token 10 including boot sector information 22 as well as digital signatures for boot files stored on the local host computer 30. At the time of issue, it is necessary to specify the machine or set of machines that the user to whom the intelligent token 10 is being issued will be granted access so that host and remote keys may be loaded. File integrity information and portions of the host operating system are also loaded onto the intelligent token 10 at this time. All data is read protected by the user's authentication information. That is, the data cannot be read unless the user password is presented correctly. The data is write protected by the security officer authentication. This arrangement prevents users from inadvertently or deliberately corrupting critical data on the intelligent token 10.

Intelligent tokens may be issued on a per host, per group, or per site basis depending on the level of security desired. Since the secrets shared by the local host, the remote host and card are configurable on the local host and the remote host, respectively, it is possible to issue intelligent tokens in a one-to-one, many-to-one, or many-to-many fashion. A one-to-one mapping of users to host corresponds to securing a machine for a single user. Analogously, many-to-one allows the sharing of a single machine, and many-to-many allows for the sharing of multiple machines among an explicit set of users. One-to-many is a possible, but usually wasteful, mapping of computer resources.

Intelligent tokens themselves may also be made more secure. Currently, authentication to the intelligent token is limited to user-supplied passwords. In most systems, three consecutive false presentations results in a intelligent token account being disabled. However, if biometric authentication is incorporated into the card, it will be possible to achieve higher assurance and user authentication.

Because of the mode in which the invention is used it might be wrongly compared with a boot from a floppy disk. While it is true that inserting a intelligent token is similar to inserting a floppy, the interaction during the boot sequence is entirely different. The intelligent token-based system incorporates at least three separate authentications, user to card, card to local host, and card to remote host. These authentications are entirely absent from the floppy boot. Further, the integrity of the boot information on a floppy is protected only by an easily removed write-protect tab; while the intelligent token requires the authentication of the security officer in order to update boot information. One may also note that the ease of carrying a intelligent token as compared with a floppy disk.

The invention is described as implemented with PC's. However, the invention may be easily implemented in any computing environment including main frame, microcomputer, work station, or laptop.

While several embodiments of the invention have been described, it should be understood that the invention encompasses various modifications and alternative forms of the embodiments. It should also be understood that the specific embodiments are not intended to limit the invention, but are intended to cover all modifications, equivalents and alternatives falling within this greater scope of the claims.

I claim:

1. In a system including a local host computer and a remote host computer, a method of accessing the remote host computer comprising:
    selecting an intelligent token having critical information stored thereon;
    communicating user authentication information between a user and the intelligent token to authenticate the user to the intelligent token;
    communicating host authentication information between the intelligent token and the local host computer responsive to authentication of the user to the intelligent token to authenticate the local host computer to the intelligent token; and
    communicating user authentication information between the intelligent token and the remote host computer without further user input to allow the remote host computer access to the critical information stored on the intelligent token responsive to authentication of the local host computer to the intelligent token.

2. The method of accessing the remote host computer of claim 1 wherein communicating user authentication information between the intelligent token and the remote host computer includes: sending a request for access from the intelligent token to the remote host computer and sending a challenge from the remote host computer to the intelligent token in response to the request for access.

3. The method of accessing the remote host computer of claim 2 wherein communicating user authentication information between the intelligent token and the remote host computer further includes: storing the challenge in a memory of the remote host computer, generating a response to the challenge in the intelligent token, sending the response to the remote host computer, and validating the response using the stored challenge.

4. The method of accessing the remote host computer of claim 3 wherein the challenge is randomly generated.

5. The method of accessing the remote host computer of claim 3 wherein the response to the challenge is based on a secret.

6. the method of accessing the remote host computer of claim 2 wherein communicating user authentication information between the intelligent token and the remote host computer includes validating the response to the challenge using the remote host computer.

7. An intelligent token for use in a computer system, comprising:
    a CPU;
    a first memory unit storing an operating system; and
    a second memory unit storing authentication information for a local host computer and access information for a remote domain to provide a user with access to the local host computer and the remote domain.

8. The intelligent token of claim 7 wherein said second memory unit stores critical information for a remote host computer.

9. The intelligent token of claim 8 wherein the critical information includes authentication information for the remote host computer.

10. The intelligent token of claim 8 wherein the critical information includes a remote access code.

11. The intelligent token of claim 7 wherein the operating system includes an operating system of a local host computer.

12. A system comprising:
    a local host computer;
    a remote domain in communication with said local host computer; and
    an intelligent token coupled to said local host computer, said intelligent token including a memory storing authentication information for said local host computer and access information for said remote domain to provide a user with access to said local host computer and to said remote domain.

13. The system of claim 12 wherein said remote domain includes a network of computers.

14. The system of claim 12 wherein said remote domain includes a remote host computer.

15. The system of claim 14 wherein said intelligent token includes means for generating a request for access to said remote host computer and said remote computer includes a challenge generator that generates a challenge responsive to the request for access and transmits the challenge to said intelligent token.

16. The system of claim 15 wherein said intelligent token includes means for generating a response to the challenge and the remote host computer includes means for validating the response.

17. In a system including a local host computer and a remote domain, a method of accessing the local host computer and the remote domain comprising:
    selecting an intelligent token having critical information stored thereon including boot information, host access codes;
    reading the host access code from the intelligent token;
    validating the host access code in the local host computer;
    reading boot information from the intelligent token upon validation of the host access code;
    executing the boot operation using boot information read from the intelligent token;
    communicating user authentication information between the intelligent token and the remote domain, the remote domain including a host computer, to authenticate the remote host computer to the intelligent token.

18. The method of claim 17 wherein communicating user authentication information between the intelligent token and the remote host computer includes: sending a request for access from the intelligent token to the remote host computer responsive to completion of the boot operation and sending a challenge from the remote host computer to the intelligent token in response to the request for access.

19. The method of claim 18 wherein communicating user authentication information between the intelligent token and the remote host computer further includes: storing the challenge in a memory of the remote host computer, generating a response to the challenge in the intelligent token and sending the response to the remote host computer.

20. The method of claim 19 further comprising validating the response in the remote host computer to allow the remote host computer access to the critical information stored on the intelligent token.

21. The method of claim 20 wherein the remote domain includes a computer network.

* * * * *